F. P. SOPRUNOFF.
REVERSING GEARING.
APPLICATION FILED FEB. 7, 1911.

1,073,448.

Patented Sept. 16, 1913
3 SHEETS—SHEET 1.

WITNESSES:
W. C. Lawson
A. C. Abbott

INVENTOR:
Feodor Protofkewitsch Soprunoff
By
Attorney

F. P. SOPRUNOFF.
REVERSING GEARING.
APPLICATION FILED FEB. 7, 1911.
1,073,448.
Patented Sept. 16, 1913.
3 SHEETS—SHEET 2.
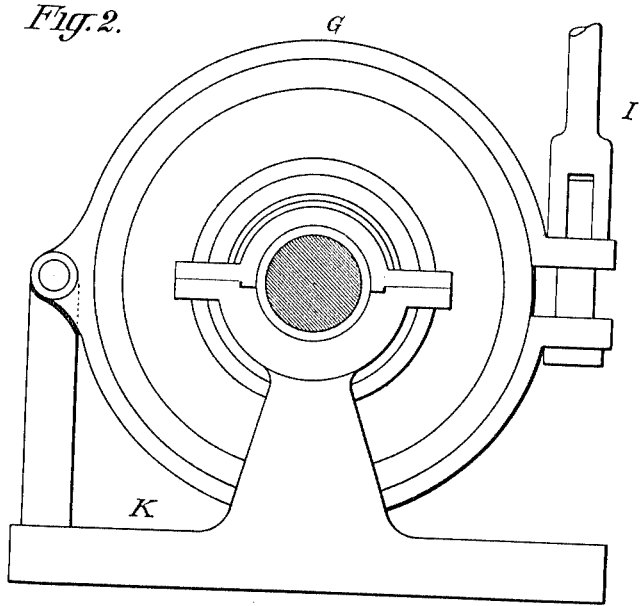
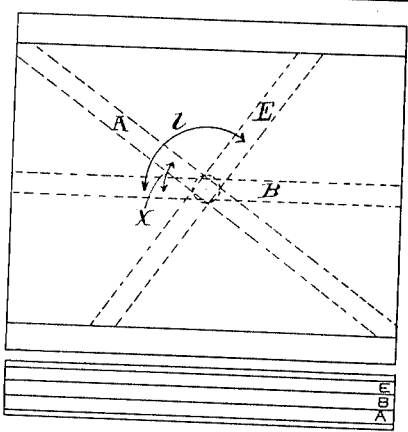
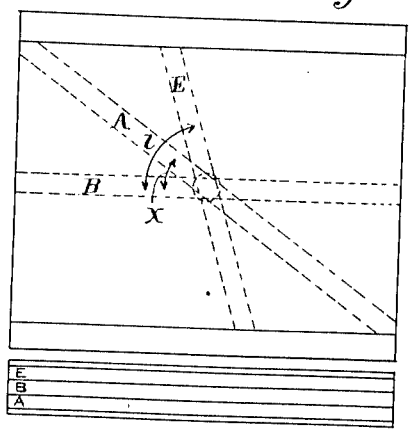
WITNESSES:
W. E. Lawson
P. C. Abbott
INVENTOR:
Feodor Protofkewitsch Soprunoff
By
Attorney

F. P. SOPRUNOFF.
REVERSING GEARING.
APPLICATION FILED FEB. 7, 1911.

1,073,448.

Patented Sept. 16, 1913.
3 SHEETS—SHEET 3.

Witnesses:
L. M. Caplinger
W. P. Lawson

Inventor:
Feodor P. Soprunoff
By
Attorney

UNITED STATES PATENT OFFICE.

FEODOR PROTOFKEWITSCH SOPRUNOFF, OF MOSCOW, RUSSIA.

REVERSING-GEARING.

1,073,448. Specification of Letters Patent. Patented Sept. 16, 1913.

Application filed February 7, 1911. Serial No. 607,048.

*To all whom it may concern:*

Be it known that I, FEODOR PROTOFKEWITSCH SOPRUNOFF, residing at Moscow, Russia, have invented certain new and useful Improvements in Reversing-Gearing, of which the following is a specification.

This invention relates to a driving gearing by means of which two shafts, which are to be coupled together, can be driven at the same speed or at different speed in the same direction. With this object the adjoining end of one shaft is in the form of a cylinder and is provided on its periphery with helical grooves, while the other shaft has a hollow cylindrical end formed with longitudinal grooves parallel to the axis of the shaft. The hollow end of this shaft incloses the solid end of the other and the grooves form passages for balls. Embracing the shafts so coupled together is a brake controlled sleeve the inner periphery of which is also formed with helical grooves, and this sleeve is adjustable longitudinally. The aforesaid grooves, coact with one another to form passages in which balls travel, and the travel of these balls is controlled by said sleeve in such a manner that the driven shaft may be rotated at the same or at a different speed in the same direction as the driving shaft.

The accompanying drawings illustrate apparatus in accordance with this invention, wherein:—

Figure 1:
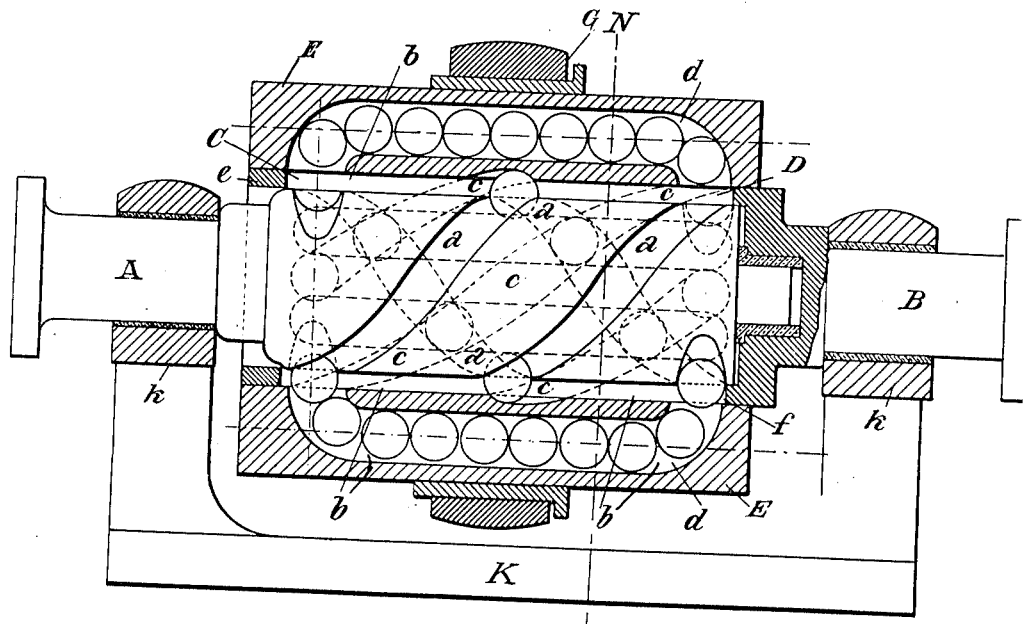
Figure 3:
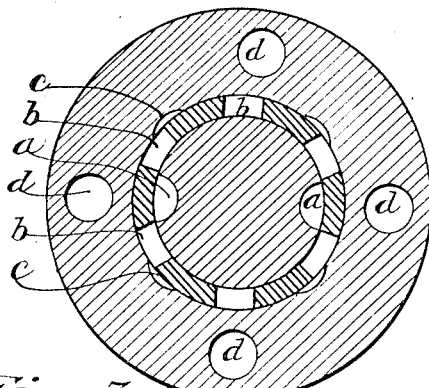

Figure 1 shows the driving gearing in longitudinal section. Fig. 2 in front view; Fig. 3 in cross-section on the line M—N of Fig. 1; and Figs. 3$^a$, 3$^b$, 4, 5, 6 and 7 diagrammatically illustrate the character of the cylindrical surfaces containing the grooves for the balls.

In these views A and B are the two shafts to be coupled together in accordance with this invention. The shaft A is solid while the shaft B, on the contrary, is provided with a hollow portion C—D into which the end portion of the shaft A is inserted. In the shaft A there are formed helical grooves $a$ of any suitable number and pitch, two such grooves being shown in Fig. 1. The hollow part C—D of the shaft B is cut away parallel to the axis A—B, to form grooves $b$ indicated by dotted lines in Fig. 1. The number of the grooves $b$ is determined by the pitch of the helical grooves $a$ and the number of these grooves on the shaft A. The hollow part C—D of the shaft B is arranged within a sleeve E, which is provided on its inner periphery with helical grooves $c$, (indicated by dotted lines in Fig. 1), the number, pitch and direction of which are dependent, first on the grooves $a$ of the shaft A, and secondly on the direction of rotation and on the extent to which the rotary speed is to be varied. In the arrangement of Fig. 1 the pitch of the grooves $c$ is double that of the grooves of the shaft A and four grooves are shown. The sleeve E is also provided with channels $d$ which communicate at each end with the helical grooves $c$ of this sleeve and the number of which depends on that of the grooves $c$. The sleeve E can be moved horizontally to the right and left by means of suitable lever mechanism. On sleeve E there is provided a brake G that is operated and released by means of the lever $l$ (Fig. 2). The entire apparatus is carried in bearings $k\ k$ which are cast on the bed-plate K. The bodies which run in the helical grooves consist, in the example shown, of balls, a certain number of which are inserted in the channels $d$ of the sleeve E.

Assuming the shaft B to be temporarily held stationary by some external force, the brake G to be released, and the shaft A to be rotating clockwise as viewed from the left in Fig. 1, it will be seen that, as soon as the ends of the channels $d$ of the sleeve E are in communication with the grooves $b$ of the hollow part C—D of the shaft B, the balls will fall out of the channels into the grooves $b$, the width of which, in the example shown in Fig. 1, is equal to the diameter of the balls, and will pass from there into the commencement of the helical grooves $a$ of the shaft A and the grooves $c$ of the sleeve E. This is possible as the sum of the depths of the grooves in the shaft A, the grooves $b$ in the hollow part C D of the shaft B, and the grooves $c$ in the inner surface of the sleeve E is equal to the diameter of the balls. Upon the further rotation of the shaft A the balls will, in accordance with the law of the revolution of forces, begin to roll both in grooves $a$ and in the grooves $b$. As, however, these latter grooves are immovable it follows that the balls must cause the sleeve E to rotate around its axis, the rotation being effected, however, in the opposite direction to that of the shaft A, that is to say the sleeve rotates in a counter-clockwise direction while the helical grooves

Figure 7:
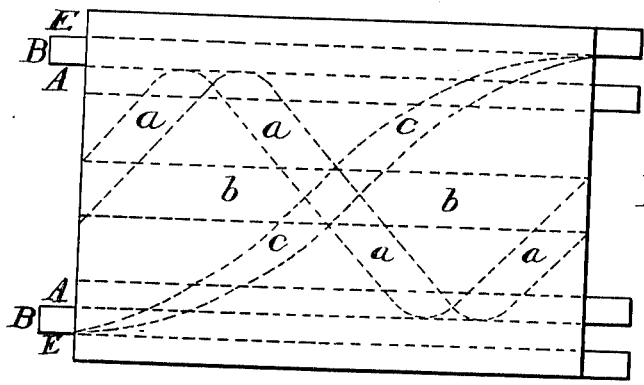
Figure 6:
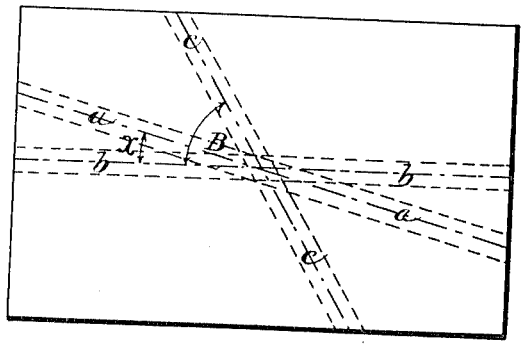
Figure 5:
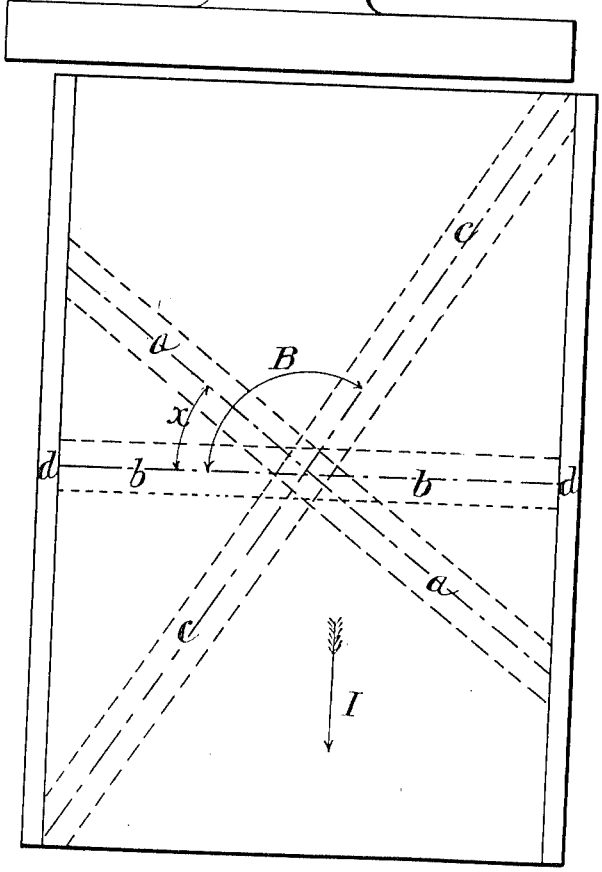
Figure 4:
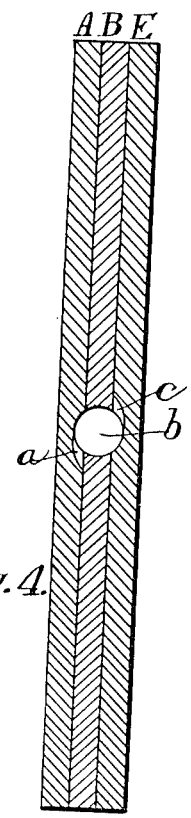

*a* and *c* run in opposite directions, the grooves *c* in Fig. 1 being right-handed. The speed of the sleeve E differs from that of the shaft A and is determined by the pitch of the helical grooves. In Fig. 1, for example, the pitch of the groove *c* is double that of the groove *a* so that the sleeve E is able to make only half a revolution in the same period in which the shaft A makes a complete revolution in the opposite direction. If now the shaft B is released and the sleeve E held stationary by means of the brake G, the shaft B will likewise begin to rotate in the same direction as the shaft A but at a different speed. In the example shown in Fig. 1 the shaft B will rotate at one-third the speed of the shaft A. During the rotation of the shaft A the balls run along the helical grooves, until they come to the right hand end thereof, and are then pushed into the right hand ends of the channels *d* thus forcing out at the other end of their channels other balls which again perform the same function as already described. If the sleeve E is moved to the right, the balls will be prevented from passing out of the grooves *a*, *b*, *c*, as the ends of their grooves become closed, with the result, that the balls form, as it were, a key. If now the brake G is simultaneously released and the shaft A rotated clockwise, the locked balls will transfer the rotation of the shaft A to the shaft B and the sleeve E, with the result that B and E will rotate in the same direction and at the same speed as A. By such means it becomes possible to drive one shaft at variable speed with relation to the other shaft. Moreover it is possible to arrest the rotation of one shaft while allowing the other to rotate freely or to cause both shafts to rotate at the same speed. Or by adopting a special construction for the helical grooves, the shafts can be caused to rotate in opposite directions, that is to say, when, for instance, the grooves *a* of the shaft A and the grooves *c* of the sleeve E are both right-handed or both left-handed, but differ in pitch, and the shaft A is rotated clockwise, while the sleeve E is held by the brake G, the shaft B will rotate in the direction opposite to that of the shaft A, and at a different speed. The same results which can be produced by means of three cylindrical surfaces, can be produced by means of three planes, which are in fact equivalent to three developed cylindrical surfaces. Thus the planes A, B and E (Fig. 4) respectively represent a development of the cylindrical surfaces A, B and E already described. The planes A, B and E being superposed on each other, the bearings *k* are replaced by straight guides *d* (Fig. 5). The plane A is furnished with the groove *a* (Fig. 4), which lies at any desired inclination to the horizontal axis; the plane E is furnished with the groove *c c* lying at any desired inclination to the horizontal axis, and the plane B with a groove *b b* which is horizontal. It is however necessary that the central lines of the grooves *a a*, *b b*, *c c* (Figs. 4 and 5) should intersect at a point in horizontal projection. It is not necessary that the number of such intersecting grooves should be restricted to three; twice, three times, or any other multiple of three grooves may be provided it being however necessary that the additional grooves corresponding to *a a*, *b b*, or *c c* should lie parallel to *a a*, *b b*, or *c c* respectively. At the point of intersection of the three grooves a round body, for instance, a ball must be arranged. Now assuming that the plane A (Fig. 5) is stationary and that the plane E is moved in the direction of the arrow 1, that is to say, downward, then the plane B will likewise move in the same downward direction at a definite speed, the velocity of which depends on the magnitude of the angles *d* and B, that is to say of the angles formed by the horizontal axis and the central lines of the grooves *a a* and *c c*. When the plane B is stationary (Fig. 5) and the planes A and E movable, the plane A will, when the plane E is moved in the direction of the arrow 1, move at a definite speed in the opposite direction. In all cases the speed obtained depends on the relation of the angles *x* and B to each other, *x* being less, and B greater than 90°. When we now consider Fig. 6 in which the angles are both less than 90°, we obtain the same results, as in Fig. 5, with the difference however that the directions of the movements produced are opposite to those of Fig. 5. Fig. 7 diagrammatically illustrates the restoration of the planes A, B and E of the Fig. 5 into cylindrical surfaces about the axis *b b*. The pitch of the groove *c c* is determined by the angle *x* less than 90° that of the groove *c c* by that of the angle B greater than 90°. The pitch of the groove *b b* may be considered to be 0° or 180°.

I claim:

1. A device of the character described having two members mounted for turning movement, and a plurality of devices interposed between said members and having engagement therewith for communicating the movement of one member to the other, each of said devices being adapted to traverse the surfaces of the respective members at angles to each other, and means capable of operation to lock the devices against movement.

2. A device of the character described consisting of a cylindrical core having helical grooves, a hollow cylinder surrounding and inclosing said core, helical grooves being provided on the inside of said hollow cylinder and being adapted to act as ball races, balls rolling in said races and a sleeve capable of rotation surrounding said hollow cylinder, said sleeve having passage ways affording a communication with the space between said sleeve and the hollow cylinder and the said grooves in the core and hollow cylinder, and means capable of operation to close the ends of the sleeve.

3. A device of the character described consisting of a cylindrical core having helical grooves, a hollow cylinder surrounding and inclosing said core, helical grooves being provided on the inside of said hollow cylinder and being adapted to act as ball races, balls rolling in said races and a sleeve capable of rotation surrounding said hollow cylinder, said sleeve having passage ways affording a communication with the space between said sleeve and the hollow cylinder and the said grooves in the core and hollow cylinder and rings adapted to be pressed from the sides against the mouths of the sleeve and thereby close the latter.

4. A device of the character described consisting of a cylindrical core having helical grooves, a hollow cylinder surrounding and inclosing said core, helical grooves being provided on the inside of said hollow cylinder and being adapted to act as ball races, balls rolling in said races and a sleeve capable of rotation surrounding said hollow cylinder, said sleeve having passage ways affording a communication with the space between said sleeve and the hollow cylinder and the said grooves in the core and hollow cylinder, means capable of operation to close the ends of the sleeve and a brake mechanism capable of operation to engage the sleeve to arrest the rotation thereof.

In testimony whereof I hereto affix my signature in presence of two witnesses.

FEODOR PROTOFKEWITSCH SOPRUNOFF.

Witnesses:
GUSTAV E. HARLWEG,
SIMON PONOMAREV.